Dec. 12, 1933.    J. C. McMURRAY    1,938,711
OIL INDICATOR FOR INTERNAL COMBUSTION ENGINES
Filed March 8, 1932
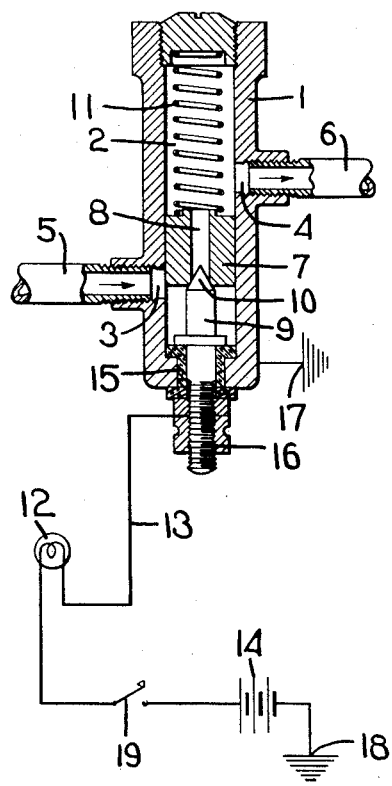
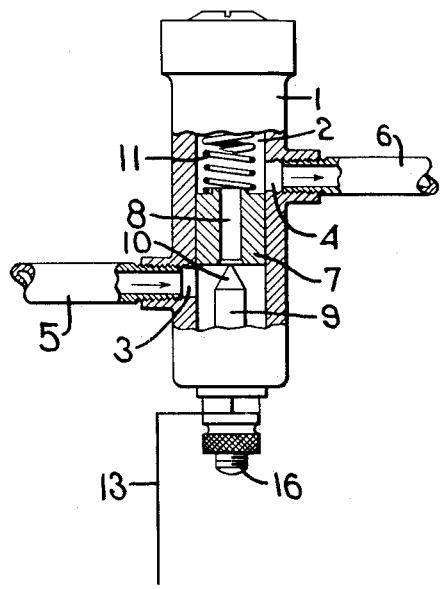
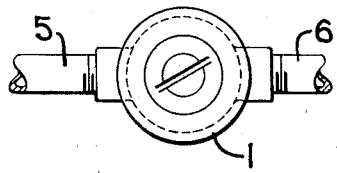
Inventor.
John C. McMurray
by Heard Smith & Tennant.
Attys.

Patented Dec. 12, 1933

1,938,711

UNITED STATES PATENT OFFICE 1,938,711

OIL INDICATOR FOR INTERNAL COMBUSTION ENGINES

John C. McMurray, Winthrop Center, Mass.

Application March 8, 1932. Serial No. 597,524

5 Claims. (Cl. 200—82)

This invention relates to an oil indicator which is designed to be used with internal combustion engines for giving an indication of the character and quantity of oil in the crank case of the engine. The indicator is constructed with a signal device which will be inoperative or inactive so long as there is a proper quantity of oil in the crank case and such oil is of the proper viscosity but which will become operative to give an indication when the oil becomes so thin that it is unsuitable for further use or when the oil becomes substantially exhausted.

The device comprises a chamber, preferably in the form of a cylinder, which is situated in the oil line so that the oil which is circulated through the oiling system by the oil pump will flow through the chamber, and also comprises a signal-controlling device which is responsive to a normal flow of oil of the proper viscosity through said chamber to render the signal inoperative but which causes the signal to give an indication if the flow ceases or if the oil flowing through the chamber has become too thin for proper use.

In order to give an understanding of the invention I have illustrated in the drawing a selected embodiment thereof which will now be described after which the novel features will be pointed out in the appended claims.

Fig. 1 is a vertical sectional view through a device embodying my invention showing the parts in the position they assume when the engine is at rest or is not operating;

Fig. 2 is a side view with a part broken out showing the position of the parts when the engine is in operation;

Fig. 3 is a top plan view of Fig. 2.

The device herein shown comprises a casing 1 provided with a chamber 2 and having an inlet 3 leading to the chamber and an outlet leading from the chamber. The inlet 3 is connected to a pipe section 5 of the oil line of the engine and another pipe section 6 is connected to the outlet 4 so that when the oil is flowing through the pipe line of the oil system it will flow through the chamber 2. This chamber may be of any suitable shape but preferably will be in the form of a cylinder. Situated within the chamber 2 and located between the inlet and the outlet is a valve device which is normally closed when there is no oil flowing through the system but which is open to permit oil to flow when the engine starts up.

This valve device is specially constructed to function as an indicator controlling member.

The valve device herein illustrated is in the form of a ported piston or plunger member 7 which fits the cylindrical chamber and is provided with a through port 8. Co-operating with this ported plunger or piston 7 is a valve member 9 in the form of a stem secured to the lower end of the chamber 1 and provided with a conical end 10 adapted to fit within one end of the port 8 as shown in Fig. 1.

The piston member 7 is acted on by a spring 11 which tends normally to hold the plunger member in its lowered position seated against the conical end 10 of the valve 9, in which position the valve device comprising the members 9 and 7, closes communication between the inlet 3 and the outlet 4. When the engine is started and there is a flow of oil through the pipe system the pressure of the oil entering the inlet 3 against the under side of the piston 7, will raise the piston against the action of the spring 11, as shown in Fig. 2, thereby opening communication between the inlet port 3 and the outlet port 4 and allowing the oil to flow through the system. So long as the flowing oil is of proper viscosity the pressure of the oil against the piston 7 will hold the piston raised thus allowing the free and proper flow of the oil. If, for any reason, the oil ceases to flow the piston 7 will resume its spring-pressed position shown in Fig. 1, or if the oil becomes unduly thin and correspondingly free flowing it will exert less pressure against the plunger 7 and the latter will tend to move toward the valve member 9 and during the operation of the engine under these conditions the plunger 7 would have a somewhat vibrating movement and would repeatedly and momentarily close onto the valve member 9.

The device includes an indicator which gives indication as to whether the plunger is seated on the valve 9 or is intermittently coming into contact with the valve 9 or whether the plunger is being held steadily in its raised position shown in Fig. 2.

While the indicator may be of any desirable type I prefer to use an electric lamp which, in the case of an automobile may conveniently be placed on the instrument board or any other convenient location. Such lamp is indicated at 12 and it is in a lamp circuit 13 which is connected to the battery 14 and is also connected to the valve member 9. This valve member is insulated from the casing 1 by suitable insulation 15 and it is shown as extending through the casing and as provided with a binding post 16 to which the wire 13 may be secured. The casing 1, of course, is grounded on the automobile frame as indicated at 17 and the battery 14 is also grounded on the automobile frame as usual as indicated at 18.

With this construction, therefore, the circuit 13 including the lamp 12 will be closed when the plunger 7 is seated on the valve 9 as shown in Fig. 1 but said circuit will be open when the plunger 7 is raised off from the valve 9 as shown in Fig. 2. The circuit 13 is shown as having a switch 19 therein which may be the ignition switch of the engine or any other suitable manually-controlled switch.

The operation of the device will be readily understood from the foregoing.

When the engine is at rest the plunger 7 will be seated against the valve 9 as shown in Fig. 1 thus closing the circuit at this point with the switch 19 open, the telltale lamp 12 will, of course, not be lighted. If the switch 19 is associated with or part of the ignition switch then said switch will be closed when the ignition switch is closed. If, however, the switch 19 is a separate manually-controlled switch then the operator will close the switch when the engine is started.

As soon as the engine is running the oil will be forced through the pipe line 5, 6 and through the chamber 2 and the flow of oil into the chamber 2 will cause the plunger 7 to rise against the action of the spring 11 as indicated in Fig. 2 thereby opening the valve and permitting oil to freely flow. So long as oil is flowing in proper quantity and so long as the flowing oil is of the proper viscosity the plunger 7 will be held in its elevated position while the engine is running, and so long as the plunger is in its elevated position shown in Fig. 2 the circuit 13 for the lamp 12 will be opened so that the lamp will be unlighted.

If, for any reason, the oil system becomes clogged so that no oil is flowing through the chamber then the spring 11 will seat the plunger 7 onto the valve 9 thereby closing the circuit 13 and causing the telltale lamp 12 to be lighted thus indicating some fault in the oiling operation. The same result would come about if the oil in the crank case becomes exhausted to a point where the pump will not cause oil to circulate through the system.

During the running of an internal combustion engine the oil in the crank case gradually becomes thinner and as this change continues the oil will finally arrive at a state of thinness where it is not suitable for further lubricating purposes. As the oil loses its viscosity it flows more freely and as the free flowing quality of the oil increases due to the increasing thinness thereof said oil will flow more freely through the port 8 so that the plunger will be forced closer to the valve 9 by the spring 11. By the time the oil reaches the critical point so far as viscosity is concerned the free flowing qualities will have increased to such an extent that during the running of the engine the plunger 7 will be nearly closed onto the valve 9 and the vibration or other movement of the engine will cause the plunger to intermittently close onto the valve thus intermittently closing the circuit 13 and causing the lamp 12 to flicker. When the lamp flickers it is an indication that the oil in the crank case should be changed.

The device herein shown, therefore, will give an indication as to whether or not the oil is flowing properly through the oil system and also as to the character of the oil flowing through the system, that is, whether it is of proper viscosity or whether it has arrived at such a state of thinness that it should be changed.

I claim

1. In an oil line, a chambered member having an inlet and an outlet, a ported plunger in said chamber between the inlet and the outlet, means normally closing the port through said plunger but responsive to oil pressure at the inlet end of the chamber to shift the position of the plunger thereby opening the port therein to allow oil to flow from the inlet to the outlet through said port.

2. In an oil line, a chambered member having an inlet and an outlet, a ported plunger fitting said chamber and movable therein, a stationary valve for the port of the plunger, and a spring acting on the plunger and normally holding it with its port in closed relation to said valve, said plunger being movable away from the valve against the action of the spring in response to oil pressure at the inlet end of the chamber thereby to open the port and permit a flow of oil therethrough from the inlet to the outlet.

3. In an oil line, a casing having a cylindrical chamber provided with an inlet and an outlet, a movable plunger fitting said chamber and provided with a through port, a valve member stationarily carried by the casing and situated in line with said port, a spring acting against the plunger and urging it towards the valve member and into port-closing relation thereto, said plunger being movable away from the valve against the action of said spring in response to oil pressure at the inlet end of said chamber thereby to open the port and permit oil to flow therethrough from the inlet to the outlet.

4. In an oil line, a casing having a cylindrical chamber and provided with an inlet and an outlet, a movable plunger fitting said chamber and provided with a through port, said plunger constituting a contact member, a valve member stationarily carried by the casing in line with said port and constituting a second contact member, a spring acting against the plunger and urging it toward the valve and into port-closing and contact-making position relative thereto, said plunger being moved away from the valve member to open the port and to break the contact in response to pressure at the inlet end of the chamber.

5. In an oil line, a chambered member having an inlet and an outlet, a ported plunger fitting said chamber and constituting a contact member and a valve member for closing the port of the plunger, said valve member also constituting a contact member, automatically-operative means urging the plunger into port-closing and contact-making position relative to said valve member, said plunger being movable to separate it from the valve member in response to pressure at the inlet end of said chamber thereby to open the port and break the contact between the plunger and valve.

JOHN C. McMURRAY.